(12) United States Patent
Hwang et al.

(10) Patent No.: US 6,339,494 B1
(45) Date of Patent: Jan. 15, 2002

(54) GAIN FLATTENED OPTICAL FIBER AMPLIFIER

(75) Inventors: Seong-Teak Hwang; Soo-Young Yoon; Rae-Sung Jung, all of Kyonggi-do (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/482,536

(22) Filed: Jan. 14, 2000

(30) Foreign Application Priority Data

Jan. 14, 1999 (KR) ................................................ 99-848

(51) Int. Cl.[7] ................................................ H01S 3/00
(52) U.S. Cl. ................................ 359/337.1; 359/341.33
(58) Field of Search .......................... 359/337.1, 341.33

(56) References Cited

U.S. PATENT DOCUMENTS

| 5,239,607 A | 8/1993 | da Silva et al. | |
| 5,253,104 A | 10/1993 | Delavaux | |
| 5,271,024 A | 12/1993 | Huber | |
| 5,436,760 A | 7/1995 | Nakabayashi | |
| 5,521,753 A | * 5/1996 | Fake et al. | ................... 359/341 |
| 6,031,646 A | * 2/2000 | Sniadower | ................... 359/160 |

FOREIGN PATENT DOCUMENTS

| JP | 10-326930 | 12/1998 |
| WO | WO 99/50978 | 10/1999 |

* cited by examiner

*Primary Examiner*—Mark Hellner
(74) *Attorney, Agent, or Firm*—Robert E. Bushnell, Esq.

(57) ABSTRACT

An optical fiber amplifier capable of having a flattened gain irrespective of the intensity of an input signal light. The optical fiber amplifier includes a first amplifying unit for amplifying an input signal light using a first pumping light to obtain a predetermined gain, a second amplifying unit for re-amplifying the signal light amplified by the first amplifying unit, using a second pumping light, to obtain the same gain as the predetermined gain, and a pumping light separating unit for allowing the amplified signal light outputted from the first amplifying unit to enter the second amplifying unit while preventing the first pumping light from reaching the second amplifying unit and preventing the second pumping light from reaching the first amplifying unit, whereby the amplified signal light entering the second amplifying unit is allowed to be amplified only by the second pumping light.

12 Claims, 2 Drawing Sheets

GAIN FLATTENED OPTICAL FIBER AMPLIFIER

CLAIM OF PRIORITY

This application makes reference to, incorporates the same herein, and claims all benefits accruing under 35 U.S.C §119 from an application entitled Gain Flattened Optical Fiber Amplifier earlier filed in the Korean Industrial Property Office on 14 Jan. 1999, and there duly assigned Serial No. 99-848 by that Office.

BACKGROUND OF THE INVENTION

1. Field of the Invention

The present invention relates to a gain flattened optical fiber amplifier, and more particularly to a gain flattened optical fiber amplifier provided with a reflection filter.

2. Description of the Prior Art

Generally, gain flattened optical fiber amplifiers are configured to have a gain flattened with respect to the intensities of an input signal light and a pumping light within a specific range. However, conventional gain flattened optical fiber amplifiers have a problem in that it is difficult to maintain a desired gain flatness when the condition of the input signal light or pumping light varies. In particular, where a plurality of optical fiber amplifiers are connected together in a multistage fashion, an input signal light may vary in condition in accordance with a variation in the loss characteristics among the amplifiers, thereby resulting in increased errors during the transmission of signal lights.

Generally, the intensity of an input signal light is detected to vary the intensity of a pumping light in accordance with the detected intensity of the input signal light, thereby compensating for a variation in gain. To this end, two pumping light sources are typically used.

FIG. 1 illustrates the configuration of a conventional optical fiber amplifier including two pumping light sources. As shown in FIG. 1, the conventional optical fiber amplifier includes a first isolator 100, a first pumping light source 102, a first wavelength division multiplexer (WDM) 104, an erbium-doped optical fiber (EDF) 106, a second pumping light source 108, a second WDM 110, and a second isolator 112.

An input signal light is applied to the first WDM 104 after passing through the first isolator 100. In the first WDM 104, the input signal light is combined with a pumping light generated from the first pumping light source 102 arranged upstream from the EDF 106. The resultant light emerging from the first WDM 104 is incident to the EDF 106.

A pumping light, which is generated from the second pumping light source 108 arranged downstream from the EDF 106, is incident to the EDF 106 via the second WDM 110. The forward and reverse pumping lights incident to the EDF 106 serve to excite erbium ions existing in the EDF 106 from a ground state. In the EDF 106, the input signal light is amplified by virtue of lights emitted in a stimulated fashion from the excited erbium ions. Each of the first and second isolators 100 and 112 serves to prevent an amplified spontaneous emission (ASE) light reflected from an optical element such as an input/output connector from being incident again to the EDF 106 to degrade an amplification efficiency for the input signal light.

Such an optical fiber amplifier is configured to adjust the ratio of population inversion at the upstream stage of the EDF 106 in accordance with a variation in the intensity of the forward pumping light while adjusting the ratio of population inversion at the downstream stage of the EDF 106 in accordance with a variation in the intensity of the reverse pumping light.

However, there is a problem in that it is impossible to freely adjust the ratio of population inversion at each stage of the EDF 106 because the intensity of the associated pumping light has an influence on the entire stage of the EDF 106.

Known prior art techniques for providing a flattened gain are disclosed by the following U.S. patents, incorporated by reference herein: U.S. Pat. No. 5,271,024 to David R. Huber entitled Optical Fiber Amplifier And Laser With Flattened Gain Slope; U.S. Pat. No. 5,253,104 to Jean-Marc P. Delavaux entitled Balanced Optical Amplifier; U.S. Pat. No. 5,239,607 to Valeria L. da Silva et al. entitled Optical Fiber Amplifier With Flattened Gain; and U.S. Pat. No. 5,436,760 to Yukinobu Nakabayashi entitled Optical Fiber Amplifier With Gain Equalizing Circuit.

SUMMARY OF THE INVENTION

It is an object of the invention to provide a gain flattened optical fiber amplifier including a pumping light separating unit arranged between two EDFs and adapted to separate forward and reverse pumping lights from each other, thereby compensating for a variation in gain in accordance with a variation in the intensity of an input signal light.

In accordance with the present invention, this object is accomplished by providing an optical fiber amplifier comprising: a first amplifying unit for amplifying an input signal light using a first pumping light to obtain a predetermined gain; a second amplifying unit for re-amplifying the signal light amplified by the first amplifying unit, using a second pumping light, to obtain the same gain as the predetermined gain; and a pumping light separating unit for allowing the amplified signal light outputted from the first amplifying unit to enter the second amplifying unit while preventing the first pumping light from reaching the second amplifying unit and preventing the second pumping light from reaching the first amplifying unit, whereby the amplified signal light entering the second amplifying unit is allowed to be amplified only by the second pumping light.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Hereinafter, preferred embodiments of the present invention will be described in detail.

Figure 1:
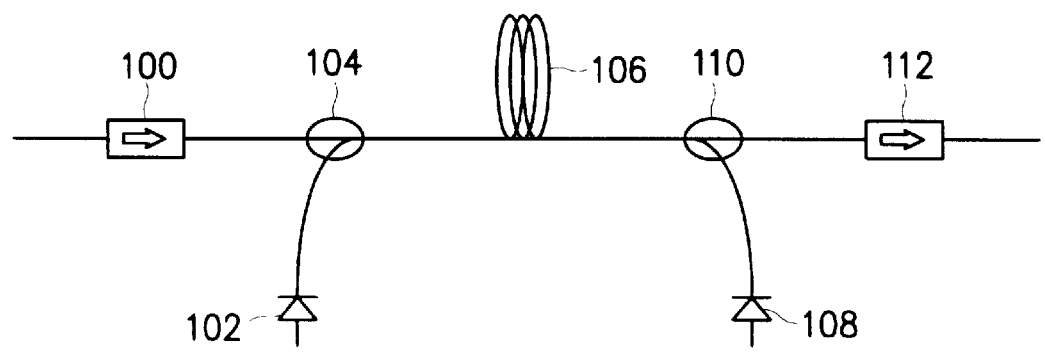
FIG. 1 is a schematic view illustrating the configuration of a conventional optical fiber amplifier including two pumping light sources.
Figure 2:
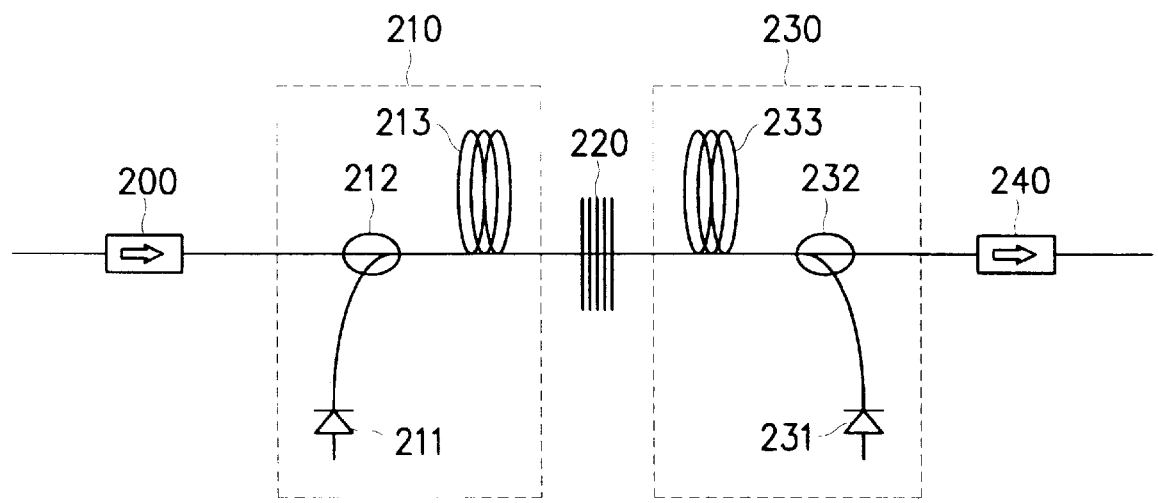
FIG. 2 is a schematic view illustrating the configuration of a gain flattened optical fiber amplifier according to the present invention.

FIG. 2 illustrates the configuration of an optical fiber amplifier according to the present invention. As shown in FIG. 2, the optical fiber amplifier of the present invention includes a first isolator 200, a first amplifying unit 210, a pumping light separating unit 220, a second amplifying unit 230, and a second isolator 240.

The first amplifying unit 210 includes a first pumping light source 211 for generating a first pumping light, a first WDM 212 for combining the first pumping light generated from the first pumping light source 211 with an input signal light passing through the first isolator 200, and a first EDF 213 for amplifying the input signal light using the first pumping light.

The second amplifying unit 230 includes a second pumping light source 231, a second WDM 232, and a second EDF 233. The second pumping light source 231 serves to generate a second pumping light. The second pumping light is supplied to the second EDF 233 by the second WDM 232. Using the second pumping light, the second EDF 233 re-amplifies the signal light amplified by the first amplifying unit 210. The second WDM 232 outputs the re-amplified signal light emerging from the second EDF 233 to the second isolator 240.

The pumping light separating unit 220 serves to prevent the first pumping light from reaching the second amplifying unit 230 while preventing the second pumping light from reaching the first amplifying unit 210. For this pumping light separating unit 220, a pumping light reflection filter is preferably used which serves to totally reflect pumping lights.

Figure 3:
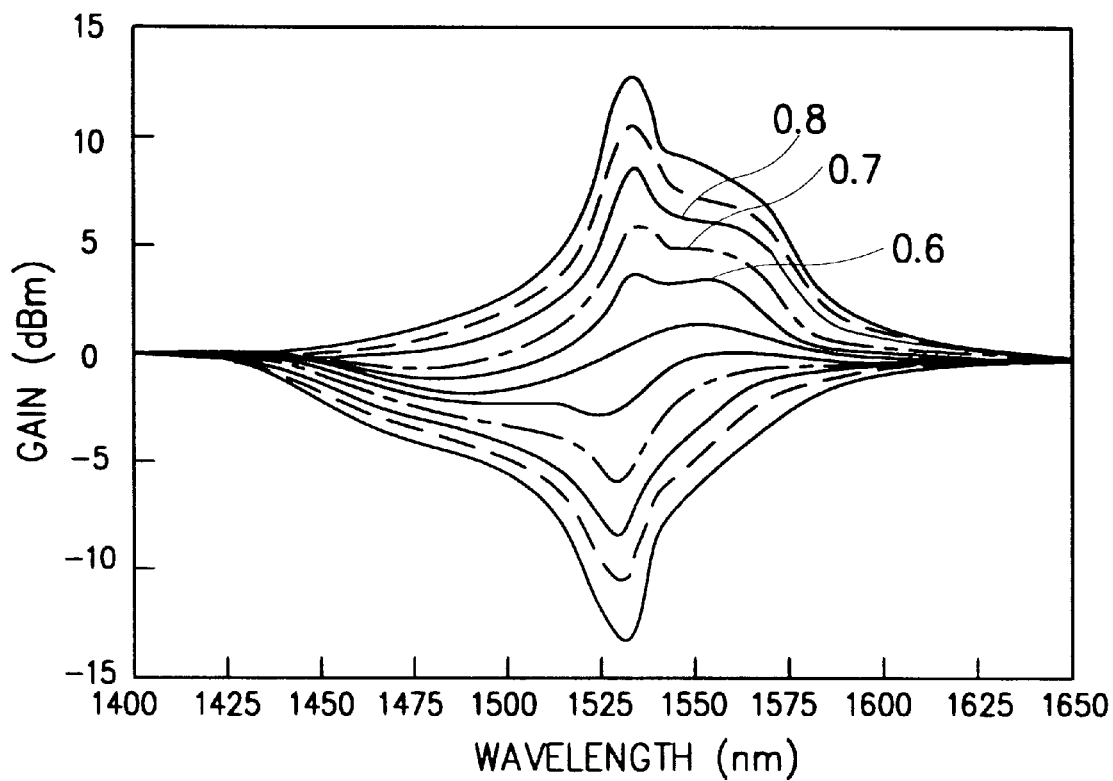
FIG. 3 is a graph depicting the gain spectrum of the optical fiber amplifier of FIG. 2 depending on the ratio of population inversion of erbium in an erbium-doped optical fiber shown in FIG. 2.

Before describing the operation of the optical fiber amplifier having the above mentioned configuration, the gain spectrum of the optical fiber amplifier depending on the ratio of population inversion of erbium in the EDF 213 or 233 will be described. FIG. 3 illustrates the gain spectrum of the optical fiber amplifier depending on the ratio of population inversion of erbium in the EDF 213 or 233 shown in FIG. 2 will be described. In FIG. 3, 11 gain spectrums are illustrated which correspond to respective ratios of population inversion ranging from 0 to 1 while having an interval of 0.1. The lowest gain spectrum in FIG. 3 corresponds to a state in which the ratio of population inversion of erbium in the EDF 213 or 233 is zero. This state corresponds to a ground state of the entire erbium in the EDF 213 or 233. In this state, the associated gain spectrum is rendered to be a spectrum for loss because the EDF 213 or 233 does not conduct any amplification. On the other hand, where the ratio of population inversion is 0.7, this means the fact that 70% of the entire erbium is in an excited state while 30% of the entire erbium is in a ground state. The gain spectrums corresponding to respective ratios of population inversion of 0.6 and 0.8 are symmetric with each other within a wavelength range of 1,540 to 1,560 nm. In other words, the gain spectrum obtained at the ratio of population inversion of 0.6 has a positive gradient whereas the gain spectrum obtained at the ratio of population inversion of 0.8 has a negative gradient. The gain spectrums respectively corresponding to those two ratios of population inversion have a compensatory relation with each other. Utilizing such characteristics, therefore, it is possible to flatten the gain of the optical fiber amplifier according to the present invention. If each of the first and second pumping lights remaining after being used for an amplification in an associated one of the first and second amplifying units 210 and 230 is prevented from reaching the other one of the first and second amplifying units 210 and 230, it is then possible to independently adjust the intensity of the pumping light in the associated one of the first and second amplifying units 210 and 230.

This makes it possible to independently adjust respective ratios of population inversion of the first and second EDFs 213 and 233, thereby adjusting associated gain spectrums. Accordingly, it is possible to flatten the gain of the optical fiber amplifier. To this end, a pumping light reflection filter is used for the pumping light separating unit 220 in accordance with the present invention. It is preferred that the distance from the first EDF 213 to the pumping light reflection filter 220 be 10 to 90% of the distance from the first EDF 213 to the second EDF 233.

Now, the operation of the optical fiber amplifier having the configuration of FIG. 2 according to the present invention will be described. A first pumping light generated from the first pumping light source 211 is first incident to the first EDF 213 via the first WDM 212, so that it excites erbium ions ($Er^{3+}$) doped in the first EDF 213. In the first EDF 213, lights are emitted in a stimulated fashion from the excited erbium ions. These lights serve to amplify an input signal light entering the first EDF 213 via the first isolator 200 and the first WDM 212. At this time, the first pumping light remaining after amplifying the input signal light is reflected by the pumping light separating unit 220, so that it serves to pump again the first EDF 213. On the other hand, the amplified signal light from the first amplifying unit 210 passes through the pumping light separating unit 220, and then enters the second amplifying unit 230.

A second pumping light generated from the second pumping light source 231 enters the second EDF 233 via the second WDM 232, so that it excites erbium ions doped in the second EDF 233. In the second EDF 233, lights are emitted in a stimulated fashion from the excited erbium ions. These lights serve to re-amplify the signal light amplified by the first amplifying unit 210. At this time, the second pumping light remaining after amplifying the signal light is reflected by the pumping light separating unit 220, so that it serves to pump again the second EDF 233.

The first and second pumping light sources 211 and 231 are adjusted in output intensity in order to allow each of the EDF 213 and 233 to obtain a ratio of population inversion meeting the characteristics of the associated amplifying unit 210 or 230.

Each of the first and second isolators 200 and 240 serve to prevent an amplified spontaneous emission (ASE) light generated from an associated one of the EDFs 213 and 233 from being incident again to the EDF 213 and EDF 233 after being reflected from an optical element such as an input/output connector to degrade an amplification efficiency for the input signal light.

As apparent from the above description, the present invention provides an optical fiber amplifier capable of having a flattened gain irrespective of the intensity of an input signal light. Accordingly, the optical fiber amplifier of the present invention is useful for long-distance transmission networks. The optical fiber amplifier of the present invention has an enhanced efficiency in that it can re-use residual pumping lights.

While the present invention has been particularly shown and described with reference to a particular embodiment thereof, it will be understood by those skilled in the art that various changes in form and detail may be effected therein without departing away from the scope of the invention as defined by the appended claims.

What is claimed is:

1. An optical fiber amplifier comprising:

a first amplifying unit for amplifying an input signal light using a first pumping light to obtain a predetermined gain;

a second amplifying unit for re-amplifying the signal light amplified by the first amplifying unit, using a second pumping light, to obtain the same gain as the predetermined gain; and a pumping light reflection filter for allowing the amplified signal light outputted from the first amplifying unit to enter the second amplifying unit and totally reflecting both the first pumping light and preventing the second pumping light, whereby the first amplifying unit is allowed to be bidirectionally pumped only by the first pumping light and the second amplifying unit is allowed to be bidirectionally pumped only by the second pumping light.

2. The optical fiber amplifier according to claim 1, wherein the first amplifying unit comprises:

a pumping light source for generating the first pumping light;

a wavelength division multiplexer for combining the input signal light with the first pumping light; and an erbium-doped optical fiber coupled to the wavelength division multiplexer and adapted to amplify the input signal light using the first pumping light.

3. The optical fiber amplifier according to claim 2, wherein the second amplifying unit comprises:

a second erbium-doped optical fiber coupled to the pumping light reflection filter and adapted to re-amplify the amplified signal light using the second pumping light;

a second wavelength division multiplexer for outputting the amplified signal light from the second erbium-doped optical fiber while inputting the second pumping light to the second erbium-doped optical fiber; and a second pumping light source for generating the second pumping light and supplying the generated second pumping light to the second wavelength division multiplexer.

4. The optical fiber amplifier according to claim 3, wherein the pumping light reflection filter is spaced apart from the first erbium-doped optical fiber by a distance corresponding to 10 to 90% of the distance from the first erbium-doped optical fiber to the second erbium-doped optical fiber.

5. An optical fiber amplifier comprising:

a first amplifying unit responsive to a first pumping light for amplifying an input signal light to obtain a first amplified signal light having predetermined gain;

a pumping light reflection filter for separating the first pumping light from said first amplified signal light by totally reflecting said first pumping light back to said first amplifying unit to again be used to amplify said input signal light, and outputting said first amplified signal light having said first pumping light removed therefrom; and a second amplifying unit responsive to a second pumping light for amplifying said first amplified signal light output from said pumping light reflection filter to obtain the an output amplified signal light having said predetermined gain, wherein said pumping light reflection filter prevents said second pumping light from being applied to said first amplifying unit by totally reflecting said second pumping light back to said second amplifying unit to again be used to amplify said first amplified signal light.

6. The optical fiber amplifier according to claim 5, wherein the first amplifying unit comprises:

a pumping light source for generating the first pumping light;

a wavelength division multiplexer for combining the input signal light with the first pumping light; and an erbium-doped optical fiber, coupled to an output of said wavelength division multiplexer, for amplifying the input signal light in response to the first pumping light.

7. The optical fiber amplifier according to claim 5, wherein the second amplifying unit comprises:

an erbium-doped optical fiber coupled to an output of said pumping light reflection filter for amplifying the first amplified signal light in response to said second pumping light;

a pumping light source for generating the second pumping light; and a wavelength division multiplexer for providing said second pumping light to said erbium-doped optical fiber and outputting said output amplified signal light having said predetermined gain.

8. The optical fiber amplifier according to claim 7, wherein the pumping light reflection filter is spaced apart from the first erbium-doped optical fiber by a distance corresponding to 10 to 90% of the distance from the first erbium-doped optical fiber to the second erbium-doped optical fiber.

9. An optical fiber amplification method comprising the steps of:

amplifying, in response to a first pumping light at a first amplifying unit, an input signal light to obtain a first amplified signal light having predetermined gain;

reflecting, in totality, the first pumping light from said first amplified signal light and outputting said first amplified signal light having said first pumping light removed therefrom;

amplifying, in response to a second pumping light at a second amplifying unit, said first amplified signal light output by said reflecting step to obtain the an output amplified signal light having said predetermined gain; and reflecting, in totality, said second pumping light to prevent said second pumping light from being applied to said first amplifying unit.

10. The method as set forth in claim 9, wherein said step of amplifying said input signal light comprises the steps of:

generating the first pumping light;

combining, in a wavelength division multiplexer, the input signal light with the first pumping light; and exciting ions of erbium in an erbium-doped optical fiber coupled to an output of said wavelength division multiplexer, with both the generated and the reflected first pumping light to amplify said input signal light.

11. The method as set forth in claim 10, wherein said step of reflecting the first pumping light comprises a step of applying said first amplified signal light output from said erbium-doped optical fiber to a pumping light reflection filter.

12. The method as set forth in claim 11, wherein said step of amplifying said first amplified signal light comprises the steps of:

generating the second pumping light;

providing said second pumping light, via a second wavelength division multiplexer, to a second erbium-doped optical fiber coupled to an output of said pumping light reflection filter, said pumping light reflection filter performing said step of reflecting said second pumping light to prevent said second pumping light from being applied to said first erbium-doped optical fiber;

exciting ions of erbium in said second erbium-doped optical fiber, in response to both the generated and the reflected second pumping light, to amplify the first amplified signal light to produce said output amplified signal light having said predetermined gain, said output amplified signal light being output via a second wavelength division multiplexer.

* * * * *